(12) United States Patent
Talwar

(10) Patent No.: US 8,186,567 B2
(45) Date of Patent: *May 29, 2012

(54) METHOD FOR FORMING A WELDBONDED STRUCTURE

(75) Inventor: Rajesh Talwar, Frontenac, MO (US)

(73) Assignee: The Boeing Company, Chicago, IL (US)

( * ) Notice: Subject to any disclaimer, the term of this patent is extended or adjusted under 35 U.S.C. 154(b) by 969 days.

This patent is subject to a terminal disclaimer.

(21) Appl. No.: 11/551,550

(22) Filed: Oct. 20, 2006

(65) Prior Publication Data

US 2007/0040002 A1 Feb. 22, 2007

Related U.S. Application Data

(63) Continuation of application No. 11/187,551, filed on Jul. 21, 2005, now Pat. No. 7,240,821.

(51) Int. Cl.
*B23K 20/12* (2006.01)

(52) U.S. Cl. .................. 228/175; 228/112.1; 156/73.5

(58) Field of Classification Search .................. 228/175, 228/112.1, 2.1; 156/73.5
See application file for complete search history.

(56) References Cited

U.S. PATENT DOCUMENTS

| | | | |
|---|---|---|---|
| 3,972,111 A | 8/1976 | Dash | |
| 4,727,232 A | 2/1988 | Omori et al. | |
| 4,743,522 A | 5/1988 | Lino et al. | |
| 6,247,633 B1 | 6/2001 | White et al. | |
| 6,543,670 B2 | 4/2003 | Mahoney | |
| 6,582,539 B2 | 6/2003 | Iwanczyk et al. | |
| 6,676,007 B2 | 1/2004 | Stevenson et al. | |
| 6,686,052 B2 | 2/2004 | Jogan et al. | |
| 6,722,556 B2 | 4/2004 | Schilling et al. | |
| 6,769,595 B2 | 8/2004 | Stol et al. | |
| 6,800,157 B2 | 10/2004 | Tarbutton et al. | |
| 6,905,060 B2 | 6/2005 | Van Aken et al. | |
| 7,225,966 B2 * | 6/2007 | Christner | 228/112.1 |
| 2003/0047587 A1 | 3/2003 | Aono et al. | |
| 2004/0041006 A1 | 3/2004 | Masingale | |
| 2004/0079787 A1 | 4/2004 | Okamoto et al. | |
| 2004/0173662 A1 | 9/2004 | Christner | |

FOREIGN PATENT DOCUMENTS

| | | |
|---|---|---|
| DE | 3815069 A1 | 11/1989 |
| JP | 11047959 A * | 2/1999 |
| JP | 2002001551 A | 1/2002 |
| JP | 2002178170 A | 6/2002 |

(Continued)

OTHER PUBLICATIONS

JPO machine translation, abstract of JP 11047959 A.*

(Continued)

*Primary Examiner* — Jessica L Ward
*Assistant Examiner* — Kevin E Yoon
(74) *Attorney, Agent, or Firm* — Yee & Associates, P.C.

(57) ABSTRACT

A method for weldbonding at least two work-pieces together includes applying an adhesive to a first surface of a first work-piece, and bringing the first surface of the first work-piece into contact with a surface of a second work-piece. The first work-piece and second work-piece are then friction stir or friction stir spot welded together, and the adhesive is cured. The use of bonding tools to maintain the two work-pieces together during curing of the adhesive is eliminated.

16 Claims, 2 Drawing Sheets

FOREIGN PATENT DOCUMENTS

| | | |
|---|---|---|
| WO | WO 2004014593 A1 | 2/2004 |
| WO | 2005021207 A1 | 3/2005 |

OTHER PUBLICATIONS

Catherine et al., "Electron beam curable adhesives for out-of-autoclave bonding of large composite structures", Bridging the centuries with SAMPE's materials and processes technology: Long Beach Convention Center, Long Beach California, May 21-25, 2000, Taylor & Francis, p. 2194.*

European Search Report (EP06253833), Nov. 24, 2006, The Boeing Company.

Hysol EA 9394—Epoxy Paste Adhesive—Data Sheet—Henkel Corporation.

Talwar et al., Laser Weldbonded Aluminum Structure, 28th Annual Meeting of the Adhesion Society, Feb. 14, 2005.

Feng, Z., Friction Stir Spot Welding of Advanced High-Strength Steels—A Feasibility Study, 2005.

Westgate, S., Weldbonding, TWI World Centre for Materials Joining Technology, 2001.

* cited by examiner

METHOD FOR FORMING A WELDBONDED STRUCTURE

CROSS REFERENCE TO RELATED APPLICATION

This application is a continuation of the U.S. patent application Ser. No. 11/187,551 filed on Jul. 21, 2005 now U.S. Pat. No. 7,240,821.

TECHNICAL FIELD

Embodiments of the present invention generally relate to friction stir welding and, more particularly, to the use of friction stir welding for the weldbonding process.

BACKGROUND

Friction stir welding is commonly used in joining two or more work pieces for various classes of materials, such as aluminum, magnesium, copper, titanium and steel. This method of welding in lap, L-joint and T-joint configurations leads to a small weld nugget size with notches on both sides of the weld nugget. Due to a higher stress concentration on either side of the weld nugget, these notches increase stress concentration factors, and reduce fatigue life.

Moreover, friction stir welding of two or more work-pieces does not seal gaps between these work-pieces as in adhesive bonding. The use of adhesive bonding is increasing dramatically as it eliminates drilling holes and installation of fasteners. It is highly desirable to replace fasteners, fusion, friction, and spot welded joints with adhesive bonded joints. Adhesive bonded joints spread loads more evenly and result in smooth surface conditions. In particular, adhesive bonding results in the elimination of stress risers at fasteners and weld locations. The automotive industry has used adhesive bonding of auto parts to increase surface finish, increase structural damping, and eliminate failure of spot welds which results in vibration noise. However, adhesive bonding of complex curvature structures is quite expensive because specialized bonding tools are required to apply pressure during curing of the adhesive. Furthermore, at room temperature, the curing of adhesive can take several days.

Weldbonding is a hybrid method of assembly that utilizes both the welding and adhesive bonding processes. Edison Welding Institute (EWI), Columbus, Ohio, developed a process using adhesive bonding accompanied or followed by laser welding. Laser weldbonding has been used on small airframe structures such as small commuter aircraft fuselages. However, laser weldbonding requires expensive equipment and the quality of the laser welds is poor. For example, laser weldbonding is difficult to use on aluminum structures, and the success of the laser weldbond depends greatly on the aluminum alloy the structure is comprised of. The auto industry has used adhesive bonding with fusion spot welding of steel. However, fusion welding of aluminum, which is used in new generation cars, is quite difficult and costly. In addition, fusion spot welding uses electrodes which create surface indentation on both upper and lower surfaces, resulting in poor surface conditions. The fusion weld also causes adhesive to splatter, thus reducing bond quality.

As can be seen, an inexpensive and effective weldbonding process is needed that will maintain two or more work-pieces together and apply pressure during curing of an adhesive without the use of any bonding tools, and will result in smooth surface conditions and evenly sealed joints for a variety of materials.

BRIEF SUMMARY

Embodiments of the present invention fulfill the above-described need by providing an improved method of joining at least two work-pieces together via friction stir welding combined with adhesive bonding.

In one embodiment of the present invention, a method includes applying an adhesive to the first surface of a first work-piece, and bringing the first surface of the first work-piece into contact with a surface of a second work-piece. The first work-piece and second work-piece are then friction stir welded together.

In another embodiment of the present invention, a method for forming a weldbonded structure comprises applying a paste or other adhesives to a first surface of a first aluminum work-piece, and bringing the first surface of the first aluminum work-piece into contact with a first surface of a second aluminum work-piece. The first work-piece and the second work-piece are friction stir or friction stir spot welded together, and the adhesive is cured at room temperature or higher temperature.

In a further embodiment of the present invention, a method is provided for weldbonding at least two work-pieces together for use in an aircraft, automotive and other products. The method includes applying an adhesive to a first surface of a first work-piece, and bringing the first surface of the first work-piece into contact with a first surface of a second work-piece. The first work-piece and the second work-piece are then friction stir welded together, and the adhesive is cured. No bonding tools are used to maintain the two work-pieces together during curing of the adhesive. These and other features, aspects and advantages of embodiments of the present invention will become better understood with reference to the following drawings, description and claims.

DETAILED DESCRIPTION

The following detailed description is of the best currently contemplated modes of carrying out embodiments of the invention. The description is not to be taken in a limiting sense, but is made merely for the purpose of illustrating the general principles of the embodiments, since the scope of the invention is best defined by the appended claims.

A method according to an embodiment of the present invention is suitable for, but not limited to, applications in the aerospace industry, shipbuilding and marine industries, railway industries, automobile industry, and construction industry. For example, the method may be used to weld work-pieces together for use in military and civilian aircraft, such as welding skins to spars, ribs, and stringers. In addition, the method may be used to produce longitudinal butt welds, lap welds, spot welds, tapered butt welds, and 5-axis contour welds.

The method utilizes friction stir welding to stitch or hold two or more work-pieces together during curing of an adhesive. Accordingly, the adhesive bonding process is made much more affordable due to the elimination of bonding tools. In addition, the method results in improved surface quality of welded components because the friction stir welding process typically welds from one side in contrast to the two sided welding used for the spot welding. The method further provides improved adhesive bonding quality, lower interface stresses, and improved cycle time.

Figure 1:
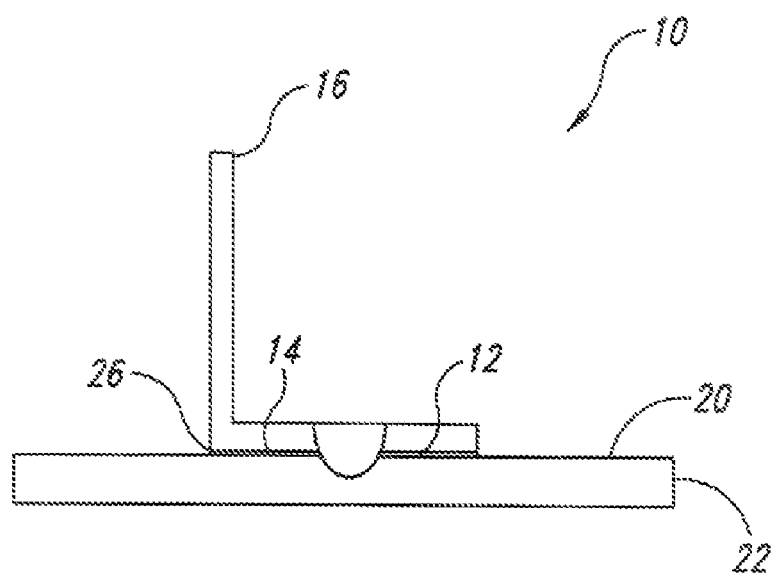
FIG. 1 is a cross sectional view of two work-pieces welded together in accordance with an embodiment of the present invention.

Referring to FIG. 1, shown is a weldbonded structure 10 made in accordance with a method as described herein. The method includes applying an adhesive 12 to a first surface 14 of a first work-piece 16 to form an adhesive layer. The adhesive 12 may be applied to the first surface 14 of the first work-piece 16 via any method known to those skilled in the art including, but not limited to spraying, or application with a brush, roller or spatula. The adhesive 12 may be any adhesive that is effective in bonding two surfaces together. For example, suitable adhesives for use in embodiments of the present invention include, but are not limited to paste or film adhesives. Preferably, the adhesive 12 is an epoxy paste adhesive such as Hysol® EA 9394 manufactured by Henkel Corporation, Bay Point, Calif. Hysol® is a registered trademark of Henkel Corporation, U.S.A. Hysol® EA 9394 is an amine-cured two-part structural epoxy paste adhesive with an aluminum powder filler. Hysol® is a registered trademark of Henkel Corporation, U.S.A.

The first surface 14 of the first work-piece 16 is brought into contact with a first surface 20 of a second work-piece 22. For example, the surfaces 14 and 20 of the first work-piece 16 and the second work-piece 22, respectively, may be maintained in contact with one another through the use of a clamp, fastener or similar device.

The first work-piece 16 and second work-piece 22 are then friction stir or friction stir spot welded together. If desired, the adhesive layer 12 may be cured at a temperature between approximately 20° C. and approximately 200° C. The adhesive layer 12 may be cured at room temperature for a period of about 1 day to about 30 days. The temperature and length of time used to cure the adhesive 12 will depend upon the type of adhesive used. It is not necessary to cure the adhesive at elevated temperatures, as in conventional adhesive bonding processes, because the friction stir weld effectively holds the surfaces 14 and 20, and work-pieces 16 and 22 together. Accordingly, the friction stir weld also eliminates the need for any bonding tools for maintaining two or more work-pieces 16 and 22 together and/or applying pressure during curing of the adhesive 12.

The combination of adhesive bonding and friction stir welding in embodiments of the present invention results in smooth surface conditions near the weld joint, and also results in evenly and completely sealed joints between the work-pieces 16 and 22. Conventional friction stir welding and friction stir spot welding results in concentrated loads, especially at the edge of the welds (at notches). It is more desirable to fabricate structures by friction stir weldbonding because loads are distributed more evenly. Furthermore, in processes utilizing friction stir welding alone, the area or joint 26 where two or more work-pieces 16 and 22 meet is not completely sealed. As a result, a crevice may form in the area or joint 26 between the work-pieces 16 and 22, and collect moisture which causes corrosion of the work-pieces. This problem is avoided in the method described herein because the joint 26 between the work-pieces 16 and 22 is completely sealed by the adhesive layer 12 as illustrated in FIG. 1. The use of adhesive bonding in the method also provides damping of vibration and noise in welded work-pieces 16 and 22.

Figure 2:
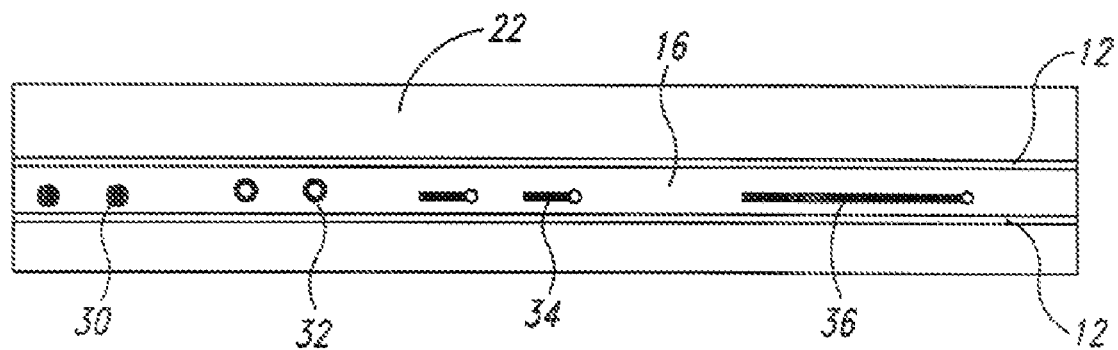
FIG. 2 is a top view of two work-pieces welded together in accordance with alternative embodiments of the present invention.

Various friction stir welding processes may be used in the method described herein. Specifically, friction stir spot welding, segmented friction stir welding and continuous friction stir welding may be utilized in the method. Examples of welds formed by these welding techniques are illustrated in FIG. 2, namely friction stir spot welds (with no tool exit hole) 30, friction stir spot welds (with tool exit hole) 32, segmented friction stir welds 34, and a continuous friction stir weld 36.

During the process of friction stir welding, which includes continuous and segmented friction stir welding, a tool with a specific geometry is plunged into, and traversed through the material to be welded. The tool's key components are a shoulder and pin (or probe). During welding, the pin travels in the material along a joint line, while the shoulder rubs on the surface of the material. Heat is generated by the tool shoulder rubbing on the surface and by the pin mixing the material below the shoulder. This mixing action permits material to be transferred across the joint line. Process variables may include rotation and travel speeds, tool design, orientation, position and tool forging load.

Figure 3A:
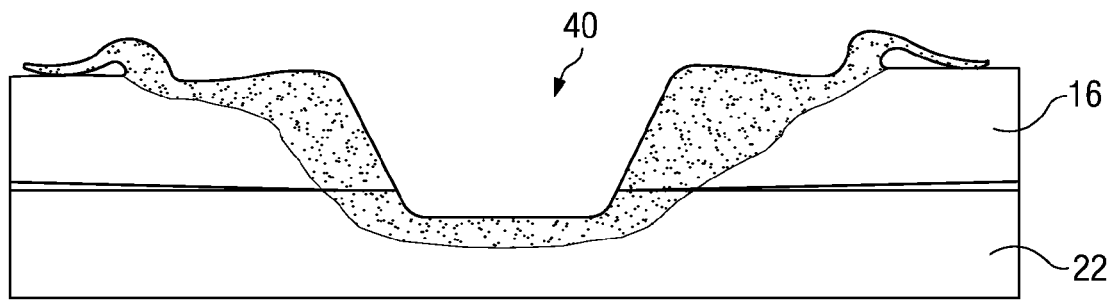
FIGS. 3A and 3B are cross sectional views of two work-pieces welded together via friction stir spot welding techniques used in accordance with alternative embodiments of the present invention.
Figure 3B:
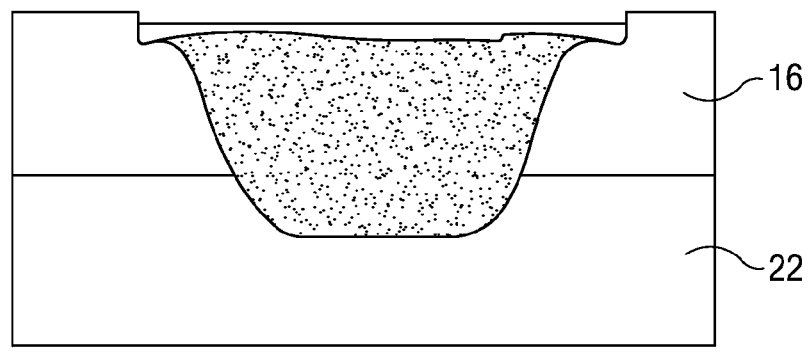

During the process of friction stir spot welding, the friction stir welding tool is plunged into and retracted from the material to be welded, without traversing through the material. In one technique, the friction stir spot weld is formed with a tool exit hole 40 in the work-pieces 16 and 22, as shown in FIGS. 2 and 3A. Alternatively, the friction stir spot welding process may be performed without leaving an exit hole 40 in the work-pieces 16 and 22, as illustrated in FIGS. 2 and 3B. An example of this alternative method, in which the tool exit hole 40 is filled, is described in U.S. Pat. No. 6,722,556 to Schilling et al. Any friction stir spot welding process, including those described above, may be used in the friction stir weldbonding method described herein.

Methods according to embodiments of the present invention may be used to effectively weld various materials, including but not limited to aluminum, steel, copper, bronze, inconel, lead, magnesium, titanium, and alloys thereof.

It should be understood, of course, that the foregoing relates to exemplary embodiments of the invention and that modifications may be made without departing from the spirit and scope of the invention as set forth in the following claims.

I claim:

1. A method for attaching a pair of work-pieces together, the method comprising:
   providing a pair of work-pieces having a layer of two-part structural epoxy paste adhesive therebetween;
   forming a plurality of tack welds, prior to a subsequent processing of curing the layer of two-part structural epoxy paste adhesive, by discontinuously friction stir welding together the pair of work-pieces to maintain the work-pieces in contact with one another during the subsequent process of curing;
   curing the layer of two-part structural epoxy paste adhesive at a temperature of between 20 degrees Celsius and 200 degrees Celsius, after forming the plurality of tack welds; and
   bonding the pair of work-pieces together, through the curing of the layer of the two-part structural epoxy paste adhesive, to create a joint that is completely sealed, the joint having a shear strength of about 4,200 psi at room temperature.

2. The method of claim 1, wherein the plurality of tack welds are formed by a friction stir welding process selected from a group consisting of segmented friction stir welding and friction stir spot welding, each tack weld of the plurality of tack welds being formed with tool exit holes in the pair of work-pieces.

3. The method of claim 1, wherein the plurality of tack welds are of a type selected from a group consisting of butt welds, lap welds, spot welds, and contour welds.

4. A method of forming a weldbonded structure, the method comprising:
  applying a curable two-part structural epoxy paste adhesive to a surface of a first work-piece;
  bringing a surface of a second work-piece into contact with the curable two-part structural epoxy paste adhesive on the surface of the first work-piece;
  maintaining the contact between the surface of the second work-piece and the surface of the first work-piece with a fastener device;
  tack welding the first work-piece to the second work-piece with a plurality of friction stirred spot welds to maintain the first work-piece and the second work-piece in contact with one another, prior to performing a subsequent processing of curing the curable adhesive;
  curing the curable adhesive at room temperature; and
  creating a completely sealed joint between the first work-piece and the second work-piece by bonding, through the curing, the surface of the first work-piece with the surface of the second work-piece, wherein the joint has a shear strength of about 4,200 psi at a temperature of 25 degrees Celsius.

5. The method of claim 4, wherein the completely sealed joint between the first work-piece and the second work-piece being maintained in contact together, is completely sealed by the curable two-part structural epoxy paste adhesive after the curing.

6. The method of claim 4, wherein applying the two-part structural epoxy paste adhesive step occurs at room temperature and substantially seals the adhesive when cured.

7. The method of claim 6, wherein the curing occurs for a period of more than one day.

8. A method for manufacturing an aircraft component comprising:
  applying a two-part structural epoxy paste adhesive to a first work-piece;
  bringing the two-part structural epoxy paste adhesive on the first work-piece into contact with a second work-piece;
  discontinuously friction stir tack welding the first work-piece to the second work-piece, wherein the friction stir welding maintains the first work-piece in contact with the second work-piece, prior to performing a subsequent process of curing the two-part structural epoxy adhesive;
  curing the two-part structural epoxy paste adhesive at a temperature of between 20 degrees Celsius and 200 degrees Celsius, after the discontinuously friction stir tack welding; and
  creating a completely sealed joint between the first work-piece and the second work-piece having a shear strength of about 4,200 psi at room temperature by bonding the first work-piece to the second work-piece with the cured two-part structural epoxy paste adhesive.

9. The method of claim 8, wherein the first work-piece is a skin and the second work-piece is one of a spar, rib and stringer.

10. The method of claim 8, wherein curing the two-part structural epoxy paste adhesive occurs at room temperature.

11. An aircraft component manufactured according to the method of claim 8.

12. A weldbonded structure comprising:
  a pair of work-pieces;
  a layer of cured adhesive disposed between work-pieces; and
  a plurality of discontinuous friction stir tack welds formed between the work-pieces prior to the adhesive being cured, the tack welds maintaining the work-pieces in contact with one another during a curing of the adhesive.

13. The weldbonded structure of claim 12, wherein the weldbonded structure is configured for an aircraft.

14. The weldbonded structure of claim 13, wherein the weldbonded structure is one of a structure selected from a group consisting of spars, ribs, and stringers.

15. The method of claim 8, wherein discontinuously friction stir tack welding comprises forming a tool exit hole in the first work-piece and the second work-piece.

16. The weldbonded structure of claim 12, wherein the plurality of discontinuous friction stir tack welds are formed with tool exit holes in the pair of work-pieces.

* * * * *